(12) United States Patent
Mahler et al.

(10) Patent No.: US 8,972,145 B2
(45) Date of Patent: Mar. 3, 2015

(54) SYSTEMS AND METHODS FOR PREDICTING TRAFFIC SIGNAL INFORMATION

(71) Applicant: Bayerische Motoren Werke Aktiengesellschaft, Munich (DE)

(72) Inventors: Grant Mahler, Clemson, SC (US); Andreas Winckler, Mountain View, CA (US); Ardalan Vahidi, Clemson, SC (US); Andre Luckow, Pullach (DE)

(73) Assignee: Bayerische Motoren Werke Aktiengesellscahft, Munich (DE)

( * ) Notice: Subject to any disclaimer, the term of this patent is extended or adjusted under 35 U.S.C. 154(b) by 0 days.

(21) Appl. No.: 13/840,830

(22) Filed: Mar. 15, 2013

(65) Prior Publication Data
US 2014/0277986 A1 Sep. 18, 2014

(51) Int. Cl.
| | |
|---|---|
| *B60T 8/32* | (2006.01) |
| *G06N 5/02* | (2006.01) |
| *G06F 7/00* | (2006.01) |
| *B60K 31/00* | (2006.01) |

(52) U.S. Cl.
CPC .. *G06N 5/02* (2013.01); *G06F 7/00* (2013.01); *B60K 31/00* (2013.01)
USPC ............................................................ 701/93

(58) Field of Classification Search
CPC ............. G08G 1/096791; G08G 1/133; B60K 31/047; G06F 3/00
USPC ........................................................... 701/93
See application file for complete search history.

(56) References Cited

U.S. PATENT DOCUMENTS

| | | | |
|---|---|---|---|
| 6,989,766 B2 | 1/2006 | Mese et al. | |
| 2011/0224893 A1* | 9/2011 | Scofield et al. | 701/119 |
| 2013/0297124 A1* | 11/2013 | Be et al. | 701/22 |
| 2014/0032087 A1* | 1/2014 | Shiri et al. | 701/117 |
| 2014/0111647 A1* | 4/2014 | Atsmon et al. | 348/148 |

OTHER PUBLICATIONS

"We're the traffic experts, so you don't have to be", INRIX, last accessed Aug. 9, 2012, http://www.inrix.com/trafficinformation.asp. (Four (4) pages).
"Audi travolution: efficiently through the city", Press Release, Audi, Jun. 1, 2010, http://.audiusanews.com/print.do?id=1812. (Two (2) pages).
"Welcome to Green Driver!", Green Driver Inc., last accessed Aug. 9, 2012, http://imagreendriver.com/index.php. (Five (5) pages).
E. Koukoumidis et al., "SignalGuru: Leveraging Mobile Phones for Collaborative Traffic Signal Schedule Advisory", MobiSys' 11, Jun. 28-Jul. 1, 2011, Bethesda, MD, U.S.A. (Fourteen (14) pages).
Copending U.S. Appl. No. 12/872,567 (Not yet published).
G. Mahler et al., "Reducing Idling at Red Lights Based on Probabilistic Prediction of Traffic Signal Timings,", Proceedings of 2012 American Control Conference, Fairmont Queen Elizabeth, Montreal, Canada, Jun. 27-Jun. 29, 2012, pp. 6557-6562. (Six (6) pages).
B. Asadi et al., "Predictive Cruise Control: Utilizing Upcoming Traffic Signal Information for Improving Fuel Economy and Reducing Trip Time," IEEE Transactions on Control Systems Technology, vol. 19, No. 3, May 3, 2011, pp. 707-714. (Eight (8) pages).

* cited by examiner

*Primary Examiner* — James Trammell
*Assistant Examiner* — Michael D Lang
(74) *Attorney, Agent, or Firm* — Crowell & Moring LLP

(57) ABSTRACT

Systems and methods for predicting traffic signal information are provided. An exemplary method includes obtaining data from a plurality of types of sources and analyzing the data to predict states of a plurality of traffic signals. The data include crowdsourced data. The predictive traffic signal information may be used to adjust an operation of an on-board system of a vehicle.

17 Claims, 2 Drawing Sheets

SYSTEMS AND METHODS FOR PREDICTING TRAFFIC SIGNAL INFORMATION

STATEMENT AS TO RIGHT TO INVENTIONS MADE UNDER FEDERALLY SPONSORED RESEARCH AND DEVELOPMENT

This invention was made with government support under Grant No. 0928533, awarded by the National Science Foundation. The government has certain rights in the invention.

BACKGROUND OF THE INVENTION

The present invention relates to systems and methods for predicting traffic signal information, and for using the predicted traffic signal information to adjust the operation of an on-board system of a motor vehicle.

Related art motor vehicles may obtain real-time traffic flow information from various information providers, such as INRIX®. These information providers combine real-time road sensor data with real-time global positioning system (GPS) data from commercial and consumer vehicles in order to provide real-time traffic flow information. An on-board vehicle system may then apply simple decision-making capabilities, such as thresholds, in order to inform the driver of road or traffic conditions in the vicinity of the vehicle. For example, the on-board vehicle system may count the number of vehicles on a road segment to determine whether that segment should be displayed as green, yellow, or red on a navigation device within the vehicle. However, this analysis does not account for historical traffic data or predict the states of individual traffic signals in the vicinity of the motor vehicle.

A related art system described in U.S. Pat. No. 6,989,766 broadcasts real-time traffic signal data to a receiver in a vehicle. The traffic signal data may include the location, current status, future traffic signal sequences, and timing information of the traffic signal. The traffic signal data may be broadcast from individual traffic signals or a central location that gathers and stores traffic signal data from multiple traffic signals. Based on the received traffic signal data, the vehicle may display a speed range that minimizes the number of starts and stops that are required and facilitates traffic flow.

Similarly, the Audi® Travolution® project uses an on-board system that receives real-time traffic signal data from individual traffic signals via dynamic short-range communication (DSRC) and provides speed recommendations to the driver. The system may also provide time-to-green and time-to-red information to the driver. However, the system does not make predictions for the traffic signals, and therefore can only provide recommendations that account for traffic lights within the short DSRC range.

In addition, Green Driver® provides a mobile telephone application that predicts the states of traffic signals based on real-time traffic signal information from a traffic center. The application calculates the speed required to pass through a traffic light before it turns red, and provides suggested routes to avoid red lights. However, Green Driver® makes predictions over a short distance, not for all traffic lights along a route to a destination. Further, the application is not integrated with the vehicle, and does not incorporate vehicle-specific information into the speed calculations.

Further, SignalGuru® uses crowdsourced data to detect and predict the traffic signal schedule. SignalGuru® uses windshield-mounted mobile telephones to acquire real-time images of traffic signals and determine the color of the traffic signal. The system analyzes data acquired from other vehicles to recommend when drivers should reduce their speed to avoid idling at a red light. The system may also recommend a detour to provide a more efficient route to a destination. However, SignalGuru® relies solely on inferior images acquired from mobile telephone cameras and problematic image analysis techniques.

Therefore, it would be desirable to provide an improved system and method for predicting traffic signal information that utilizes data from more than one source, and that uses advanced models and machine learning techniques that consider historical data. It would also be desirable to use the predictive traffic signal information to adjust the operation of an on-board system of a vehicle, particularly an on-board system that can improve fuel consumption and reduce harmful emissions.

SUMMARY OF THE INVENTION

According to an aspect of the invention, a method of predicting traffic signal information is provided. The method includes obtaining data from a plurality of types of sources and analyzing the data to predict states of a plurality of traffic signals. The data include crowdsourced data.

The crowdsourced data may include real-time and/or historical data obtained from a plurality of vehicles. Further, the crowdsourced data may include global positioning system (GPS) data from cellular telephones, cellular tower triangulation, vehicles, and/or navigation devices. In addition, the crowdsourced data may include data from cameras embedded in vehicles.

The data also may include real-time and/or historical data from a traffic center. Further, the data may also include real-time data from the plurality of traffic signals. The data may be analyzed by modeling, data mining, and/or machine learning.

According to another aspect of the invention, a method of using predictive traffic signal information to adjust the operation of an on-board system of a vehicle is provided. The method includes receiving the predictive traffic signal information from outside of the vehicle; integrating the predictive traffic signal information with internal information about the vehicle; and adjusting the operation of the on-board system based on the predictive traffic signal information and the internal information about the vehicle.

The predictive traffic signal information is generated by obtaining data from a plurality of types of sources, and analyzing the data to predict states of a plurality of traffic signals. The data include crowdsourced data.

The method may also include generating at least one optimal velocity profile based on the predictive traffic signal information. The internal information may include an engine map, a transmission map, and/or a current vehicle speed.

The on-board system may be an eco-driving system, and the method may also include modifying a speed recommendation of the eco-driving system based on the predictive traffic signal information and the internal information about the vehicle. In addition, the method may also include modifying a gear recommendation of the eco-driving system based on the predictive traffic signal information and the internal information about the vehicle.

The on-board system may be a differential control system, and the method further comprises modifying a differential parameter based on the predictive traffic signal information and the internal information about the vehicle. The on-board system may be a navigation system, and the method may also include modifying a directional recommendation of the navigation system based on the predictive traffic signal information and the internal information about the vehicle.

The on-board system may be an engine-start-stop system, and the method may also include modifying a timing of turning an engine on or off based on the predictive traffic signal information and the internal information about the vehicle. The on-board system may be a cruise control system, such as an adaptive cruise control system, and the method may also include modifying a speed of the vehicle based on the predictive traffic signal information and the internal information about the vehicle.

Other objects, advantages, and novel features of the present invention will become apparent from the following detailed description of the invention when considered in conjunction with the accompanying drawings.

DETAILED DESCRIPTION OF EXEMPLARY EMBODIMENTS

Figure 1:
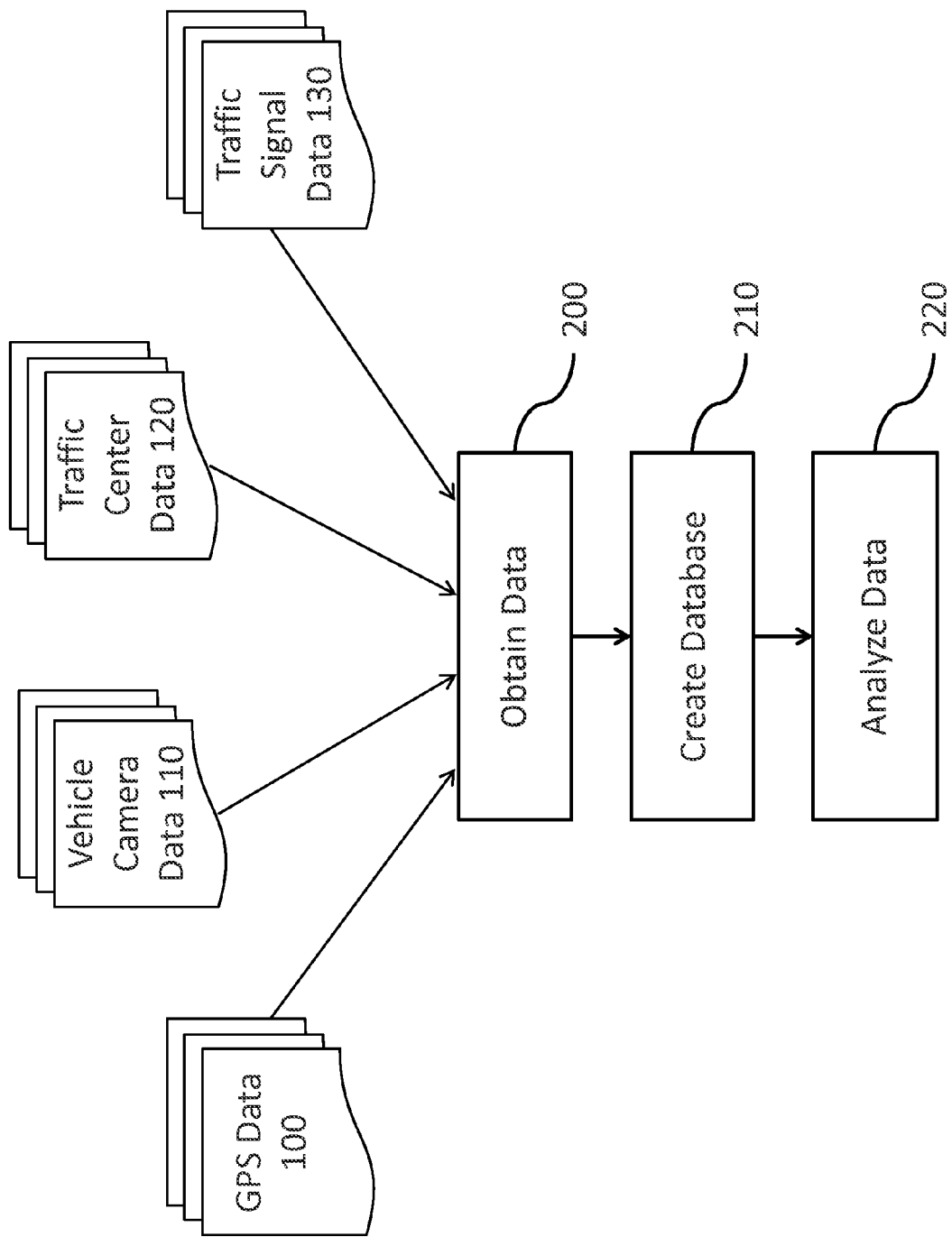
FIG. 1 shows a method of predicting traffic signal information according to an exemplary embodiment of the invention.

Exemplary embodiments of the invention combine data from a plurality of different types of sources into a database, and analyze the data to make predictions regarding states of traffic signals. The data may include crowdsourced data and data obtained from other sources, such as traffic centers. For example, as shown in FIG. 1, the data may include GPS data 100, vehicle camera data 110, traffic center data 120, and/or traffic signal data 130. The GPS data 100 may include data from cellular telephones, cellular tower triangulation, vehicles, and/or navigation devices. The vehicle camera data 110 may be obtained from cameras that are embedded in vehicles, and record images from the driver's field of view.

The traffic center data 120 may include nearly real-time and/or historical data from a commercial or governmental traffic center. The traffic center data 120 typically include a collection of data from a plurality of traffic signals. For example, a city may collect raw data from traffic signals and send the raw data to vehicles, or a third party such as Green Driver® may obtain the raw data from the city, analyze the data, and send traffic signal predictions to vehicles. The traffic signal data 130 may include real-time data from a plurality of traffic signals. For example, each individual traffic signal may send real-time data regarding its status directly to vehicles.

FIG. 1 shows that data are obtained from various sources at step 200, and combined into a database at step 210. The data are then analyzed at step 220. Advanced modeling, data mining, and/or machine learning techniques may be used to predict traffic signal information, including signal phase and timing (SPAT) information. Due to the complexity of the algorithms, a computer processor is required to perform the data analysis at step 220.

Linear discriminant analysis is one technique that may be used to analyze the data at step 220. For example, the data may include various information or attributes, such as the presence or absence of vehicle calls at a traffic signal, the presence or absence of pedestrian calls at the traffic signal, how long the traffic signal has been red, yellow, or green, etc. Linear discriminant analysis may then be used to predict how much longer the traffic signal will remain red, yellow, or green. For example, the data may be discretized in one-second intervals, or any other appropriate duration. Each interval is then treated as a class, and the linear discriminant analysis predicts which class the set of attributes belongs to.

As another example, Markov-type models may be used to analyze the data at step 220. These models calculate a transition probability, which is the probability, based on a current set of attributes, of going to another set of attributes. The transition probability is based on previous data. Accordingly, if a current set of attributes is known, Markov-type models may be used to determine the probability of transitioning to another set of attributes. For example, the duration that the traffic signal has been a particular color, the presence or absence of vehicle calls at the traffic signal, and/or other attributes may be used to determine the probability that the traffic signal will transition to another color.

By using data from more than one type of source, exemplary embodiments of the invention may enable improved models that provide more accurate predictions of traffic signal information. Further, machine learning techniques are able to use historical data in order to further improve the accuracy of the predictions. The results are not limited to a localized area, and can be used to predict SPAT information along the driver's entire route. In addition, accounting for specific route information may reduce the volume of data that is analyzed and increase the overall accuracy of the predictions.

According to another exemplary embodiment of the invention, the predictive traffic signal information may be used to adjust the operation of an on-board system of a vehicle. For example, the predictive traffic signal information may be used to reduce idling and optimize fuel efficiency. Several on-board systems may be adjusted, such as an eco-driving system, a navigation system, an engine-start-stop system, and/or a cruise control system. In this exemplary embodiment, the predictive traffic signal information is received from outside of the vehicle, and is integrated with internal information about the vehicle, as described in more detail below.

Figure 2:
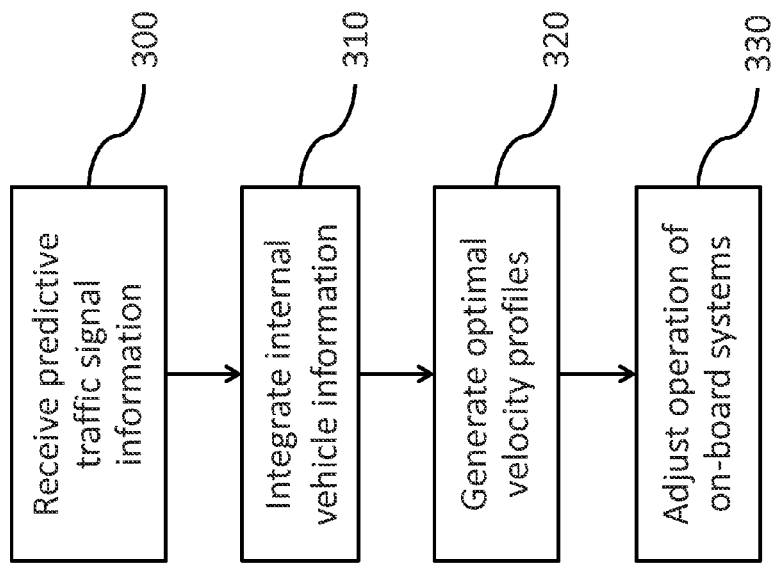
FIG. 2 shows a method of using the predictive traffic signal information to adjust the operation of an on-board system of a vehicle, according to an exemplary embodiment of the invention.

As shown in FIG. 2, a receiver in the vehicle receives the predictive traffic signal information from outside of the vehicle at step 300. The communication may occur over any suitable network. The predictive traffic signal information is then integrated with internal information about the vehicle at step 310. For example, the internal information may include an engine map, a transmission map, a position of the vehicle, and/or a current vehicle speed. Optimal velocity profiles may be generated based on the predictive traffic signal information and the internal information at step 320. The optimal velocity profiles are designed to reduce wait time at stop lights and fuel consumption. The optimal velocity profiles may be generated by any appropriate method, such as the methods disclosed in copending U.S. application Ser. No. 12/872,567; G. Mahler et al., "Reducing Idling at Red Lights Based on Probabilistic Prediction of Traffic Signal Timings," Proceedings of 2012 American Control Conference Proceedings, Montreal, Canada, June 2012, pp. 6557-6562; and B. Asadi et al., "Predictive Cruise Control: Utilizing Upcoming Traffic Signal Information for Improving Fuel Economy and Reducing Trip Time," IEEE Transactions on Control Systems Technology, vol. 19, pp. 707-714, 2011, the entire disclosures of which are hereby incorporated by reference.

The operation of at least one on-board system is then adjusted at step 330. The operation may be adjusted directly from the integrated predictive traffic signal information and the internal information, in which case it is unnecessary to generate the optimal velocity profiles at step 320. Alternatively, the operation may be adjusted indirectly from the optimal velocity profiles.

One example of an on-board system that may be adjusted is an eco-driving system, such as the ECO PRO® mode developed by BMW®, which reduces fuel consumption and harmful emissions from the vehicle. A related art eco-driving system makes a speed recommendation to the driver based on engine and transmission maps, the current speed of the vehicle, and other inputs from the vehicle. The system may also adjust accelerator and transmission parameters, as well as the climate control system and other electrical systems within the vehicle.

An exemplary embodiment of the invention improves the eco-driving system by using the integrated predictive traffic signal information and the internal information, and/or the optimal velocity profiles, to modify the speed recommendation. For example, the speed recommendation may be adjusted to avoid idling at a red light. This may increase the fuel economy of the vehicle and reduce the vehicle pollution footprint. An exemplary embodiment of the invention may also modify a recommendation from the eco-driving system to upshift, downshift, or change gear based on the integrated predictive traffic signal information and the internal information, and/or the optimal velocity profiles.

In addition, exemplary embodiments of the invention may adjust a differential control system of a vehicle. The differential of the rear axle allows the rear drive wheels to spin independently from each other. For example, when the vehicle turns, the outer wheel may spin faster than the inner wheel. The differential control system may electronically adjust differential parameters, such as differences in the torque and/or angular speed of the wheels. According to exemplary embodiments of the invention, if the vehicle is stopped at a red light, the differential control system may be adjusted to lock the differential immediately before the light turns green to provide the maximum tractive force when accelerating in a straight line. Likewise, if the vehicle will be making a turn at a green light, the differential control system may be adjusted to unlock the differential such that the wheels may rotate at different speeds, and the driver may accelerate out of the turn without spinning the inner wheel.

Another example of an on-board system that may be adjusted is a navigation system. A related art navigation system makes a directional recommendation based on map data, and may also account for traffic flow information. An exemplary embodiment of the invention improves the navigation system by using the integrated predictive traffic signal information and the internal information, and/or the optimal velocity profiles, to modify the directional recommendation. This may influence the initial route calculation and/or adjust the route guidance as the vehicle travels along the route. For example, the directional recommendation may be adjusted to avoid red lights. Because exemplary embodiments of the invention are able to predict the state of traffic signals several minutes in advance, the navigation system can advantageously use this information to optimize a route and make large-scale adjustments to the directional recommendation. The navigation system may re-route the vehicle to the shortest route by changing the weights for the route segments based on the predictive traffic signal information. The navigation system may also avoid routes with traffic signals that are always set to become red after a previous light has turned green.

Yet another example of an on-board system that may be adjusted is an engine-start-stop system for an internal combustion engine. A related art engine-start-stop system only turns the engine on when the clutch or brake pedal is released, and only turns the engine off based on on-board sensors and information, such as the brake position sensor. An exemplary embodiment of the invention improves the engine-start-stop system by using the integrated predictive traffic signal information and the internal information, and/or the optimal velocity profiles, to modify the timing of turning the engine on or off. For example, the engine-start-stop system may turn the engine off earlier, such as when the vehicle is coasting toward a red light. In addition, the engine-start-stop system may optimize the operation of the heating, ventilation, and air conditioning (HVAC) system and/or other vehicle systems. For example, the engine-start-stop system may start the HVAC system before arriving at a traffic signal that will remain red for two minutes or any other appropriate duration. Further, the engine-start-stop system may engage the alternator clutch and charge the battery in advance of idling at a long red light. However, if the traffic signal will only remain red for a short time period, such as five seconds or any other appropriate duration, then the engine-start-stop system may not start the HVAC system, in order to prevent excessive wear and tear on the battery. In this situation, the engine-start-stop system may also leave the engine running, to prevent driver fatigue that may be caused by turning off the engine for short periods of time. This may also prevent a reduction in fuel economy caused by the startup sequence for the engine, which can require substantial amounts of fuel.

In addition, various components of a hybrid vehicle may be adjusted based on the predictive traffic signal information and the internal information about the vehicle. In a hybrid vehicle, it is advantageous to remain in the electric mode as long as possible, and turning off the engine early can increase the range of the vehicle. For example, if the vehicle is approaching a red light, it may be advantageous to turn off the engine before reaching the red light, and allow the vehicle to coast to the red light. Further, the HVAC system may be adjusted based on the predicted length of a red light. For example, if the temperature inside of the vehicle will not rise above the temperature set by the driver by a predetermined amount, the battery and the AC may remain off until a light turns green and the engine turns on. In addition, driver fatigue may be prevented by not turning the engine on and off in quick succession. For example, if a light is expected to remain red for a short duration, the engine may remain on to avoid disturbing the driver by turning the engine on soon after it is turned off.

A further example of an on-board system that may be adjusted is a cruise control system, such as an adaptive cruise control system. A related art cruise control system optimizes the speed of the vehicle based on radar information, along with the engine and transmission maps. An exemplary embodiment of the invention improves the cruise control system by using the integrated predictive traffic signal information and the internal information, and/or the optimal velocity profiles, to modify the speed of the vehicle. For example, the cruise control algorithm may be adjusted to adapt the speed so that the vehicle only passes through green lights, and does not idle at red lights. The cruise control system may also adjust the engine speed and gear selection accordingly.

According to another exemplary embodiment of the invention, there is provided a non-transitory computer-readable medium encoded with a computer program for performing the method described above. The term "computer-readable medium" as used herein refers to any medium that participates in providing instructions for execution. Common forms of computer-readable media include, for example, a floppy disk, a flexible disk, a hard disk, magnetic tape, any other magnetic medium, a CD-ROM, any other optical medium, a RAM, a PROM, an EPROM, a FLASH-EPROM, any other memory chip or cartridge, a flash drive, and any other non-transitory medium from which a computer can read.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of using predictive traffic signal information to adjust an operation of an on-board system of a vehicle, the method comprising:
    receiving the predictive traffic signal information from outside of the vehicle;
    integrating the predictive traffic signal information with internal information about the vehicle; and
    adjusting the operation of the on-board system based on the predictive traffic signal information and the internal information about the vehicle;
    wherein the predictive traffic signal information is generated by:
        obtaining data from a plurality of types of sources; and
        analyzing the data to predict states of a plurality of traffic signals,
        wherein the data comprise crowdsourced data.

2. The method according to claim 1, wherein the data comprise at least one of data from a traffic center or data from the plurality of traffic signals.

3. The method according to claim 1, wherein the crowdsourced data comprise historical data obtained from a plurality of vehicles.

4. The method according to claim 1, wherein the crowdsourced data comprise real-time data obtained from a plurality of vehicles.

5. The method according to claim 1, wherein the crowdsourced data comprise global positioning system (GPS) data from at least one of cellular telephones, cellular tower triangulation, vehicles, or navigation devices.

6. The method according to claim 1, wherein the crowdsourced data comprise data from cameras embedded in vehicles.

7. The method according to claim 1, wherein the data comprise at least one of real-time or historical data from the traffic center.

8. The method according to claim 1, wherein the data comprise real-time data from the plurality of traffic signals.

9. The method according to claim 1, wherein the data are analyzed by at least one of modeling, data mining, or machine learning.

10. The method according to claim 1, further comprising generating at least one optimal velocity profile based on the predictive traffic signal information.

11. The method according to claim 1, wherein the internal information comprises at least one of an engine map, a transmission map, a position of the vehicle, or a current vehicle speed.

12. The method according to claim 1, wherein the on-board system is an eco-driving system, and the method further comprises modifying a speed recommendation of the eco-driving system based on the predictive traffic signal information and the internal information about the vehicle.

13. The method according to claim 1, wherein the on-board system is an eco-driving system, and the method further comprises modifying a gear recommendation of the eco-driving system based on the predictive traffic signal information and the internal information about the vehicle.

14. The method according to claim 1, wherein the on-board system is a differential control system, and the method further comprises modifying a differential parameter based on the predictive traffic signal information and the internal information about the vehicle.

15. The method according to claim 1, wherein the on-board system is a navigation system, and the method further comprises modifying a directional recommendation of the navigation system based on the predictive traffic signal information and the internal information about the vehicle.

16. The method according to claim 1, wherein the on-board system is an engine-start-stop system, and the method further comprises modifying a timing of turning an engine on or off based on the predictive traffic signal information and the internal information about the vehicle.

17. The method according to claim 1, wherein the on-board system is an cruise control system, and the method further comprises modifying a speed of the vehicle based on the predictive traffic signal information and the internal information about the vehicle.

* * * * *